Feb. 13, 1962   E. J. YOUNG ET AL   3,021,109
IRRIGATION VALVE
Filed Dec. 16, 1958   2 Sheets-Sheet 1

Emil J. Young
Lucile F. Young
INVENTORS

BY Clarence A. O'Brien
and Harvey B. Jacobson
Attorneys

Feb. 13, 1962 E. J. YOUNG ET AL 3,021,109
IRRIGATION VALVE
Filed Dec. 16, 1958 2 Sheets-Sheet 2
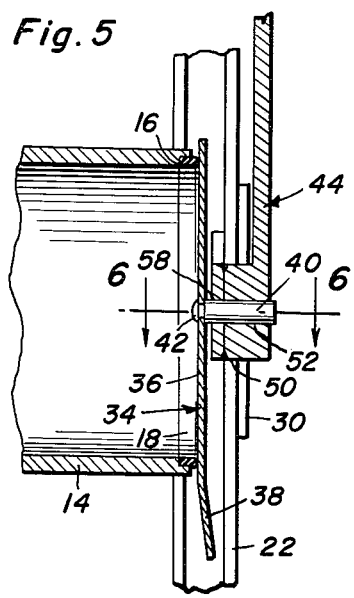
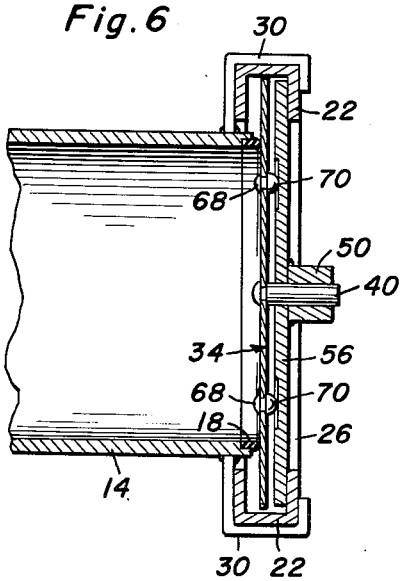
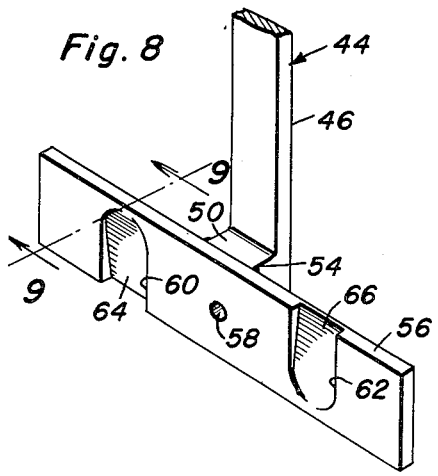
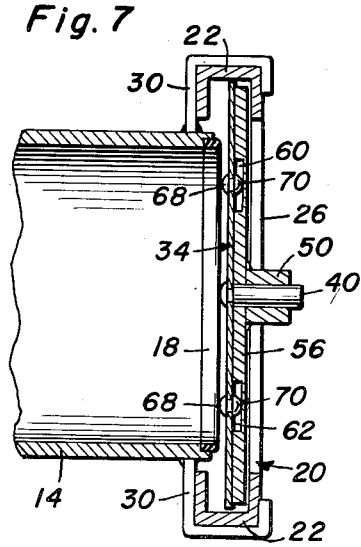
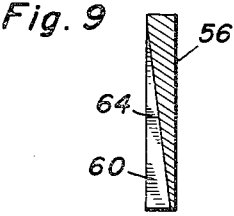
Emil J. Young
Lucile F. Young
INVENTORS

United States Patent Office 3,021,109
Patented Feb. 13, 1962

3,021,109
IRRIGATION VALVE
Emil J. Young and Lucile F. Young, both of
P.O. Box 145, Garfield, N. Mex.
Filed Dec. 16, 1958, Ser. No. 780,815
5 Claims. (Cl. 251—204)

This invention relates in general to new and useful improvements in valve construction, and more specifically to an improved valve for use in conjunction with irrigation lines.

In the construction of irrigation lines, it is necessary not only to maintain the lines as light as possible, but also to reduce the cost of all the components of the irrigation lines to a minimum. Accordingly, one of the problems encountered in conjunction with the irrigation systems is the cost of valves. While there are all types of suitable valves, due to the size of the irrigation line, the cost of conventional type valves is prohibitive.

It is therefore the primary object of this invention to provide an improved valve intended primarily for use and in conjunction with irrigation lines and which is of extremely simple construction so that the manufacture and use thereof is economically feasible.

Another object of this invention is to provide an improved valve primarily intended for use in irrigation lines, the valve having an extremely simple operating mechanism which will lock it in any desired position with a minimum of effort.

Another object of this invention is to provide an improved valve which may be used for the controlling of water through pipes, the valve including a pipe section which has associated with one end thereof a trackway, a valve member being guidingly carried by the trackway for movement transversely of the end of the pipe section and being cammed into engagement with the end of the pipe section so as to form a seal therewith.

A further object of this invention is to provide a valve construction which includes a pipe having a free end, the end of the pipe being engaged by a valve member to control the flow of water through the pipe member, the valve, being in the form of a simple plate which is positioned by means of a handle, which handle also has connected thereto means for camming the valve member against the end of the pipe so as to provide the necessary seal between the valve member and the pipe.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 5 is an enlarged fragmentary vertical sectional view taken through the valve and shows the valve member in a fully closed position, the view clearly showing the sealing relationship between the valve member and the valve body;

FIGURE 6 is a enlarged fragmentary sectional view taken substantially upon the plane indicated by the section line 6—6 of FIGURE 5 and shows further the details of the valve;

FIGURE 7 is an enlarged fragmentary sectional view similar to FIGURE 6 and shows the valve member in a released position;

FIGURE 8 is an enlarged perspective view of the operating member for the valve and shows the operating member removed from the valve member; and FIGURE 9 is an enlarged transverse sectional view taken substantially upon the plane indicated by the section line 9—9 of FIGURE 8 and shows the specific details of the camming surface of the operator for the valve member.

Figure 1:
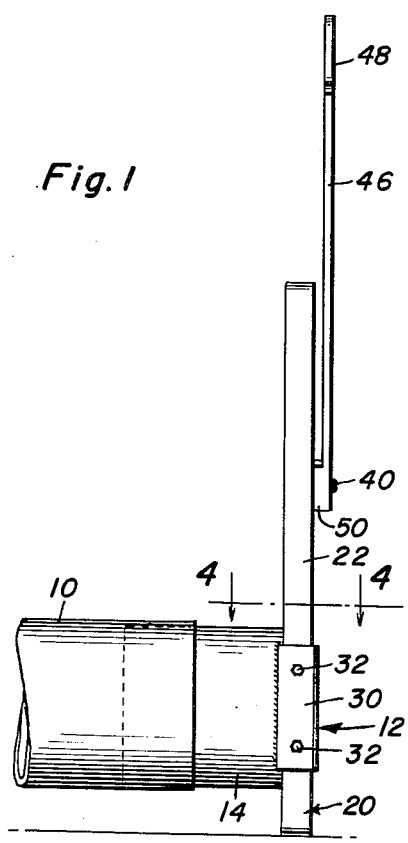
FIGURE 1 is a side elevational view of the valve which is the subject of this invention and shows it connected to an end portion of an irrigation pipe, the valve member of the valve being shown in an open position.

Referring now to the drawings in detail, there is illustrated in FIGURE 1 an irrigation pipe 10 to which there is connected the valve which is the subject of this invention, the valve being referred to in general by the reference numeral 12. The valve 12 includes a valve body 14 which is in the form of a short section of pipe, the valve body 14 being of a diameter so as to be telescoped within the irrigation pipe 10. At this time it is pointed out that the connection between the valve body 14 and the irrigation pipe 10 may be any desired.

In order that an effective seal may be obtained, the end of the valve body 14 remote from the irrigation pipe 10 is provided with an annular recess 16, as is best illustrated in FIGURE 5. Seated in the annular recess 16 is a resilient ring which forms a valve seat 18. It is to be noted that the valve seat 18 projects beyond the outer end of the valve body 14.

Figure 4:
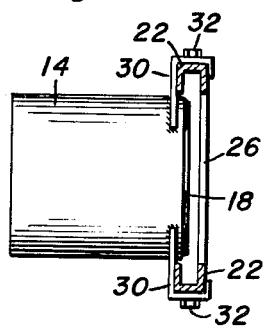
FIGURE 4 is a fragmentary sectional view taken substantially upon the plane indicated by the section line 4—4 of FIGURE 1 and shows the specific details of the construction of the trackway of the valve, the valve being disassembled from the irrigation pipe.

Secured to that end of the valve body 14 carrying the valve seat 18 is a trackway which is refererd to in general by the reference numeral 20. The trackway 20 includes a pair of vertically disposed track members 22 which are connected together at their upper ends by a transverse member 24 and at their lower ends by transverse frame member 26. The tracks 22 and the transverse frame members 24 and 26 are each of a channel-shaped cross-section, as is clearly illustrated in FIGURE 4.

Figure 2:
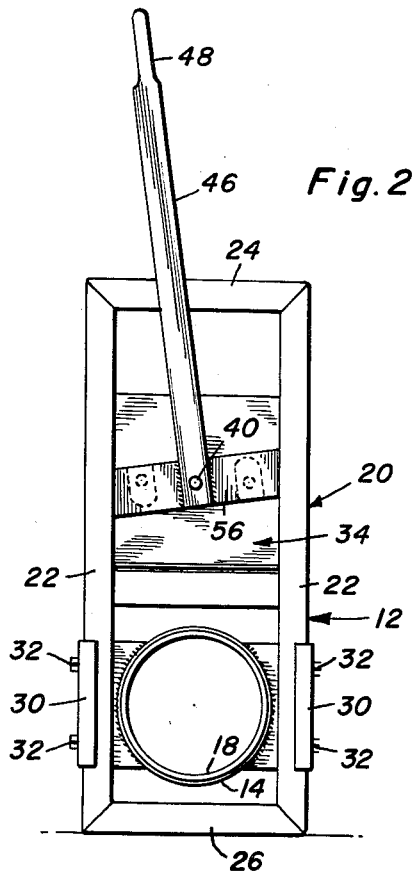
FIGURE 2 is an end view of the valve member of FIGURE 1 and shows further details of the valve, the handle for the valve being shown in a released position which permits the movement of the valve member relative to the pipe section of the valve.
Figure 3:
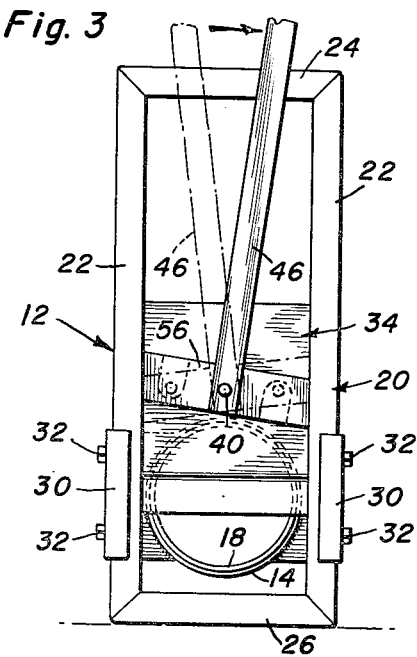
FIGURE 3 is an end view similar to FIGURE 2 and shows the valve member in a partially closed position, the handle for the valve member being shown in a locked position.

The trackway 20 is secured to the valve body 14 by means of a pair of horizontally disposed brackets 30 which are best illustrated in FIGURES 1, 2 and 3. Brackets 30 are generally channel-shaped in outline and have nested therein the tracks 22. The tracks 22 are secured to the brackets 30 by means of fasteners 32. It is to be noted that the trackway 20 is disposed in alignment with the end of the valve body 14.

Slidably mounted within the trackway 20 for vertical movement is a valve member 34. The valve member 34 is in the form of a thin metal plate 36 which has the lower portion thereof bent forwardly as at 38. This permits the lower edge of the valve member 34 to move downwardly over the valve seat 18 without damaging the valve seat 18.

Secured to a central part of the valve member 34, as is best shown in FIGURE 5, is a pivot pin 40. The pivot pin 40 is secured to the valve member 34 by means of a rivet portion 42. Rotatably journalled on the pivot pin 40 is an operator which is referred to in general by the reference numeral 44.

The operator 44 includes an elongated shift lever 46 which terminates at the upper end thereof in a handle 48. The lower part of the shift lever 46 includes a projecting part 50 having a bore 52 therethrough receiving the pivot pin 40. Secured to the projection 50 as by welding 54 is a cam member 56. The cam member 56 is in the form of an elongated strap and has a centrally located aperture 58 therethrough which is aligned with the bore 52. Pivot pin 40 also passes through the aperture 58. It is to be noted that the cam member 56 is of a width so as to be received in track member 22 and at the same time is free for limited pivoting about the pivot pin 40.

Formed in the upper surface of the cam member 56 which faces the valve member 34 is a pair of recesses 60 and 62. The recess 60 opens downwardly and has an upwardly sloping cam surface 64. The recess 62 opens upwardly and has an upwardly sloping cam surface 66.

As is best illustrated in FIGURE 7, carried by the valve member 34 is a pair of pins 68 having rounded heads 70. The heads 70 are seated in the recesses 60 and 62 and bear against the cam surfaces 64 and 66 thereof.

When the shift lever 46 is in the position illustrated in FIGURE 2, the valve member 34 is released from the valve seat 18, as is best shown in FIGURE 7. However, when the shift lever 46 is swung to the right, as viewed in FIGURE 2, to the solid line position of FIGURE 3, the pivoting of the cam member 56 results in the camming of the valve member 34 to the left into engagement with the valve seat 18, as is shown in FIGURE 6, due to the engagement between the pin 68 and the cam surfaces 64 and 66. Thus, the valve member 34 is simultaneously urged into sealed engagement with the valve seat 18 and into a locked position with respect to the trackway 20 due to the frictional engagement of the cam member 56 with the trackway 20. It is to be understood that the valve member 34 may be moved to the desired position by either upward or downward movement on the lever 46. Inasmuch as the combined weight of the lever 46, the cam member 56 and the valve member 34 is relatively small, it will be readily apparent that the desired movement may be easily accomplished once the valve member 54 has been released.

From the foregoing, it will be readily apparent that there has been devised an extremely simply valve which may be manufactured at a relatively low cost and which will provide the desired seal necessary for many applications including the use in conjunction with irrigation pipes.

The foregong is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An irrigation valve comprising a pipe section having first and second ends, a trackway secured to said pipe section in alignment with said first end, said trackway being disposed in a plane disposed substantially parallel to said first end, a valve member slidably mounted in said trackway for movement between a pipe closing position and an open position, and an operator connected to said valve member for positioning said valve member, said operator including a handle, a plate fixedly secured to said handle, opposite ends of said plate being engaged for slidable movement in said trackway, means pivotally connecting a central part of said plate to said valve member, and cam means on said plate and said valve member urging said plate and said valve member apart upon rotation of said plate relative to said valve member, said cam means including a pair of spaced recesses formed in said plate, each of said pair of recesses disposed on opposite sides of said central part and defining cam surfaces therein, and pins carried by said valve member engaged with said cam surfaces.

2. An irrigation valve comprising a pipe section having first and second ends, a trackway secured to said pipe section in alignment with said first end, said trackway being disposed in a plane disposed substantially parallel to said first end, a valve member slidably mounted in said trackway for movement between a pipe closing position and an open position, and an operator connected to said valve member for positioning said valve member, said operator including a handle, a plate fixedly secured to said handle, opposite ends of said plate being engaged for slidable movement in said trackway, means pivotally connecting a central part of said plate to said valve member, and cam means on said plate and said valve member urging said plate and said valve member apart upon rotation of said plate relative to said valve member, said cam means including a pair of spaced recesses formed in said plate, each of said pair of recesses disposed on opposite sides of said central part and defining cam surfaces therein, and pins carried by said valve member engaged with said cam surfaces, said pipe section first end having a projecting resilient valve seat engaged by said valve member.

3. An irrigation valve comprising a pipe section having first and second ends, a trackway secured to said pipe section in alignment with said first end, said trackway being disposed in a plane disposed substantially parallel to said first end, a valve member slidably mounted in said trackway for movement between a pipe closing position and an open position, and an operator connected to said valve member for positioning said valve member, said operator including a handle, a plate fixedly secured to said handle, opposite ends of said plate being engaged for slidable movement in said trackway, means pivotally connecting a central part of said plate to said valve member, and cam means on said plate and said valve member urging said plate and said valve member apart upon rotation of said plate relative to said valve member, said cam means including a pair of spaced recesses formed in said plate, each of said pair of recesses disposed on opposite sides of said central part and defining cam surfaces therein, and pins carried by said valve member engaged with said cam surfaces, said pipe section first end having a projecting resilient valve seat engaged by said valve member, said valve member having a leading edge tapered away from said valve seat to facilitate the sliding of said valve member relative to said valve seat.

4. The combination of claim 1 wherein said second end of said pipe section is of sufficient length and outside diameter for snug connection within the adit end of an irrigation pipe and is axially and rotationally movable therein and constitutes the sole means for mounting and supporting said valve.

5. The combination of claim 1 including mounting brackets secured to the opposite sides of said trackway and mounted upon diametrically opposite sides of said pipe section.

References Cited in the file of this patent

UNITED STATES PATENTS

| | | |
|---|---|---|
| 1,238,259 | Campbell | Aug. 28, 1917 |
| 1,999,921 | Burkhardt | Apr. 30, 1935 |
| 2,001,094 | Cuttle | May 14, 1935 |
| 2,236,352 | McCarty | Mar. 25, 1941 |
| 2,876,986 | Knox | Mar. 10, 1959 |

FOREIGN PATENTS

| | | |
|---|---|---|
| 27,014 | Great Britain | Nov. 20, 1909 |
| 13,059 | Great Britain | May 31, 1911 |